United States Patent [19]

Takayasu et al.

[11] Patent Number: 5,311,227
[45] Date of Patent: May 10, 1994

[54] LIQUID CRYSTAL PROJECTION DISPLAY DEVICE WITH MIRROR

[75] Inventors: Akio Takayasu; Toshihiro Suzuki; Takeshi Goto; Tetsuya Kobayashi; Tetsuya Hamada; Yoshinori Tanaka; Takashi Kanno; Masaru Ishiwa; Makoto Goshima; Noriyuki Ohashi; Hisashi Yamaguchi, all of Kawasaki, Japan

[73] Assignee: Fujitsu, Limited, Kanagawa, Japan

[21] Appl. No.: 1,293

[22] Filed: Jan. 6, 1993

[30] Foreign Application Priority Data

Jan. 8, 1992 [JP] Japan .................. 4-1619

[51] Int. Cl.⁵ .......................... G03B 21/28
[52] U.S. Cl. ........................ 353/37; 353/31
[58] Field of Search ............ 353/31, 34, 37, 94, 353/98, 99; 358/231, 60; 359/48, 49, 70

[56] References Cited

U.S. PATENT DOCUMENTS

| 4,679,069 | 7/1987 | Andrea et al. | 353/37 |
| 5,042,921 | 8/1991 | Sato et al. | 359/40 |
| 5,105,265 | 4/1992 | Sato et al. | 353/34 |

FOREIGN PATENT DOCUMENTS

| 0037316 | 2/1988 | Japan | 353/31 |
| 2253292 | 10/1990 | Japan . | |
| 344623 | 2/1991 | Japan . | |
| 4006543 | 1/1992 | Japan | 353/37 |
| 4036745 | 2/1992 | Japan | 353/34 |
| 4277734 | 10/1992 | Japan | 553/34 |

OTHER PUBLICATIONS

Color Liquid Crystal Display, Dec. 14, 1990, pp. 201 to 203.

Primary Examiner—William A. Cuchlinski, Jr.
Assistant Examiner—William C. Dowling
Attorney, Agent, or Firm—Armstrong, Westerman, Hattori, McLeland & Naughton

[57] ABSTRACT

A projection display device comprising three projection lenses arranged in a row in a side by side relationship and having respective optical axes extending toward a screen, and three liquid crystal display panels forming images of red, green and blue color lights, the liquid crystal display panels and the projection lenses being arranged to form sets individually. A mirror is arranged between the display element and the projection lens of at least one of the sets. Accordingly, one of the display elements is arranged so as to face in a first direction and the adjacent display element so as to face in a second direction. It is thus possible to reduce the distance between the adjacent projection lenses even if the size of the liquid crystal display panels is enlarged.

18 Claims, 17 Drawing Sheets

LIQUID CRYSTAL PROJECTION DISPLAY DEVICE WITH MIRROR

BACKGROUND OF THE INVENTION

1. Field of the Invention

The present invention relates to a projection display device used in an image processing field, and more specifically, the present invention relates to a projection display device in which images of red, green and blue color lights formed by display elements such as liquid crystal panels are projected onto a screen by projection lenses and these images are superposed on the screen.

2. Description of the Related Art

In a prior art projection display device for obtaining a large color display, three cathode lay tubes (CRT) and three projection lenses are used to project images of red, green and blue color lights onto a screen so as to superpose these images on the screen. However, the projection display device using cathode lay tubes is very large in size, and it is not actually used.

Recently, projection display devices using liquid crystal panels have been proposed. For example, Japanese Unexamined Patent Publication (Kokai) No. 2-253292 and No. 3-44623 disclose a projection display device comprising a source of light, dichroic mirrors for separating the light from the source into blue, green and red color light, three liquid crystal panels forming images of red, green and blue color lights, respectively, a color mixing optical element(s) such as a dichroic mirror or a dichroic prism for fixing the images formed by the liquid crystal panels, and a projection lens for projecting the mixed images to a screen.

Also, there is another known projection display device disclosed, for example, on pages 201 to 203 of the publication entitled "Color Liquid Crystal Display", published in 1990 in Japan. This projection display device comprises a source of light, dichroic mirrors for separating the light from the source into red, green and blue, three liquid crystal panels forming images of blue, green and red color light, respectively, and three projection lenses arranged in association with the liquid crystal panel to form sets individually. The images of red, green and blue color lights are projected onto a screen by projection lenses and these images are superposed on the screen. This projection display device has a more compact optical system than that of the above described projection display device including the color mixing optical element, and the device as a whole should be made small. Accordingly, in order to obtain a compact device, it is desirable to arrange the device so that three liquid crystal panels and three projection lenses are used for projecting the images of blue, green and red color light onto the screen so as to superpose the images on the screen. Also, in this publication, mirrors are arranged between the liquid crystal panels and the projection lenses, respectively, so that all the liquid crystal panels are arranged in a common vertical plane and the projection lenses are arranged in a horizontal plane.

In the arrangement using three liquid crystal panels and three projection lenses, three projection lenses are arranged in a row in a side by side relationship on a line extending horizontally and parallel to the screen with respective optical axes extending parallel to each other toward the screen. Accordingly, the axis of the central projection lens is directed to the center of the screen, and the axes of the outer projection lenses are directed to positions slightly shifted from the center of the screen. If the axes of all the projection lenses are directed to the center of the screen, the optical axes of the outer projection lenses are inclined relative to the screen, so that the image projected from the outer projection lens is distorted to a trapezoidal shape and does not coincide with the images projected from the remaining projection lenses. Accordingly, the resultant image may be distorted.

To superpose the images on the screen, the centers of the images projected from all of the projection lenses must coincide with the center of the screen. To this end, the axes of the outer liquid crystal panels are preferably arranged at positions slightly shifted from the axes of the associated outer projection lenses, respectively, so that a light obliquely incident on the center of the outer liquid crystal panel and passing through the center of the projection lens reaches the center of the screen. Hereinafter, this is referred to an offset of axis. If the amount of the offset of axis becomes large, a problem occurs in that uneven color distribution and color shift tend to increase because of an unbalanced mixing of red, green and blue color lights and a directional distribution of light intensity occurring on the screen.

Concurring recent requirements for a high definition display (an increase in the number of pixel elements), the size of liquid crystal panels are increasing. In the case where all of the liquid crystal display panels are arranged on a common vertical plane (and all of the liquid crystal display panels face the screen), the distance between the centers of the adjacent liquid crystal display panels is the width of one liquid crystal display panel plus a space between the adjacent liquid crystal display panels. The distance between the centers of the adjacent liquid crystal display panels is smallest when the adjacent liquid crystal display panel are brought into contact. In the prior art, the liquid crystal display panels are substantially coaxially arranged with the projection lenses, respectively, and the distance between the centers of the adjacent projection lenses substantially equals the distance between the centers of the adjacent liquid crystal display panels. When the mirrors are arranged in the prior art, as described in the above referenced publication, the distance between the centers of the adjacent projection lenses substantially equals the distance between the centers of the adjacent liquid crystal display panels, because all of the liquid crystal panels are arranged on a common plane and all of the projection lenses are also arranged on a common plane.

Therefore, the distance between the centers of adjacent projection lenses becomes larger with an increase in the size of the liquid crystal panels. When the distance between the centers of the central projection lens and the outer projection lens becomes larger, the inclination of the line passing through the center of the outer projection lens and the center of the screen becomes larger and the amount of the offset of axis also becomes larger. If the amount of the offset of axis becomes larger, problems arise in that the resolution and brightness of the image at the peripheral region thereof are reduced, the viewing angle dependency of the liquid crystal increases, and the contrast is reduced. For this reason, there are severe requirements for the projection lenses. Also, a problem arises in that uneven color distribution and the color shift become larger since a convergent angle becomes larger.

It is preferable to constitute the screen from a plate having lenticules on opposite surfaces thereof in order to prevent uneven color distribution and color shift. While the screen made by the plate having lenticules on opposite surfaces thereof is effective for preventing uneven color distribution and color shift, resolution of the display is relatively low because it is difficult to manufacture very thin plate having lenticules on opposite surfaces thereof with an accurate pitch. It is preferable to constitute the screen from a plate having a lenticule on one surface thereof and a light diffusion plate in order to improve the resolution of the display, but it is difficult to reduce the uneven color distribution and the color shift when the distance between adjacent projection lenses is relatively large.

SUMMARY OF THE INVENTION

The object of the present invention is to provide a projection display device in which the distance between adjacent projection lenses can be reduced so as to reduce uneven color distribution and color shift.

According to the present invention, there is provided a projection display device comprising a source of light, a plurality of display elements receiving light from the source and capable of forming images, respectively, a plurality of projection lenses arranged in a row in a side by side relationship and having respective optical axes extending parallel to each other, the display elements and the projection lenses being arranged to form sets individually, and a mirror arranged between the display element and the projection lens of at least one of the sets so that the display element in said at least one set faces in a first direction and the display element in the adjacent set faces in a second direction different from the first direction.

With this arrangement, the mirror is arranged between the display element and the projection lens of at least one of the sets. This mirror bends the path of light between the display element and the projection lens of that set in accordance with a predetermined feature. The feature of bending the path of light is such that the display element in said at least one set faces in a first direction and the display element in the adjacent set faces in a second direction different from the first direction. Accordingly, these display elements are not located on a common plane, and it is possible to arrange the projection lenses associated with these display elements in a relatively close relationship, without the adjacent display elements contacting each other. It is thus possible to reduce uneven color distribution and color shift on the screen.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
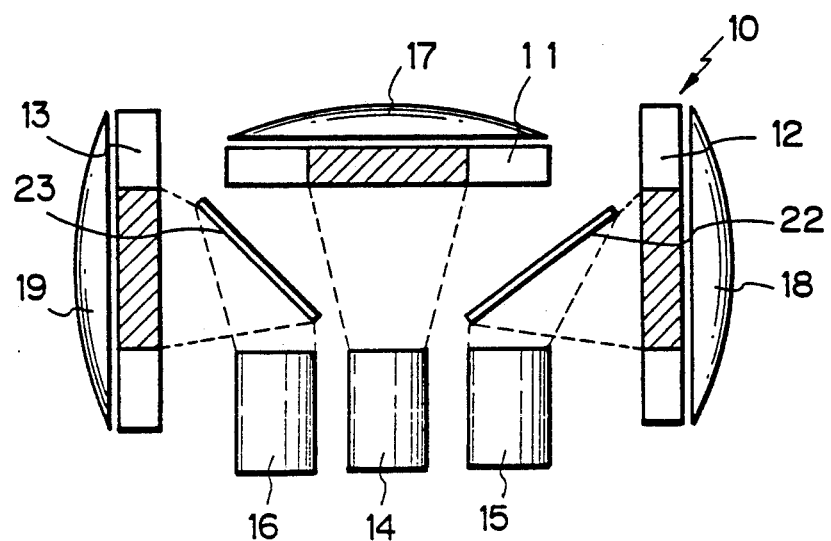
FIG. 1 is a diagrammatic view of a projection display device according to the first embodiment of the present invention.

FIG. 1 shows a projection display device 10 according to the first embodiment of the present invention. The projection display device 10 comprises three display elements 11, 12 and 13, and three projection lenses 14, 15 and 16. Condenser lenses 17, 18 and 19 are arranged in front of the display elements 11, 12 and 13, respectively. The projection lenses 14, 15 and 16 are associated with the display elements 11, 12 and 13 to form sets individually. The projection lenses 14, 15 and 16 are arranged in a row in a side by side relationship and have respective optical axes extending parallel to each other so as to project images of light formed by the display elements 11, 12 and 13 toward a screen (not shown). In the drawings, the display element 11 and the projection lens 14 form the central set, the display element 12 and the projection lens 15 form the outer right set, and the display element 13 and the projection lens 16 form the outer left set, which are also applied in the following embodiments.

Each of the display elements 11, 12 and 13 comprises a liquid crystal panel. As is well known, the liquid crystal panel includes a liquid crystal inserted between a pair of transparent glass plates having electrodes on the inner surfaces thereof, respectively, to drive the liquid crystal and form an image. The pair of transparent glass plates are joined together by an annular seal that encloses the liquid crystal between the glass plates. A portion of the liquid crystal panel, in which the liquid crystal is inserted, is a displaying zone and the displaying zone of each of the display elements 11, 12 and 13 is represented by a hatching in the drawings. The pair of glass plates include a peripheral zone outside the displaying zone, and terminals extending from the displaying zone, integrated circuits (ICs) for driving the liquid crystal, and connecting means for connecting the ICs to an outer drive circuit are mounted on the peripheral zone. Accordingly, when the width of the displaying zone is, for example, 65 millimeters, the width of the display element including the entire panel is approximately 120 millimeters. Also, each of the display elements 11, 12 and 13 includes a polarizer and an analyzer on either side of the liquid crystal panel. The display elements 11, 12 and 13 are arranged to receive a light via dichroic mirrors (see FIG. 3), which separate the light into green, blue, and red color lights.

In FIG. 1, a mirror 22 is arranged between the display element 12 and the projection lens 15 of the right set. Also, a mirror 23 is arranged between the display element 13 and the projection lens 16 of the left set. However, a mirror is not arranged between the display element 11 and the projection lens 14 of the central set, and the display element 11 and the projection lens 14 of the central set face in the same direction toward the screen (not shown).

The mirror 22 bends the optical path between the display element 12 and the projection lens 15 of the right set, whereby the display element 12 of the right set faces the projection lens 15 from the right side perpendicular to the projection lens 15, while the display element 11 and the projection lens 14 of the central set face in the same direction. That is, the display element 12 is arranged in a different direction from the direction of the display element 11. Similarly, the mirror 23 bends the optical path between the display element 13 and the projection lens 16 of the left set, whereby the display element 13 of the left set faces the projection lens 15 from the left side perpendicular to the projection lens 15. That is, the display element 13 is arranged in a different direction from the direction of the display element 11 and the right display element 12 and the left display element 12 face each other. Also, the length of the optical path between the display element and the projection lens of each set equals that of the remaining sets.

With this arrangement, it is understood that the distance between the projection lenses 14 and 15 or 14 and 16 of the adjacent sets is considerably smaller than the distance between the projection lenses of adjacent sets assuming that a mirror is not arranged between the display element and the projection lens of any of the latter adjacent sets, and all of the display elements 11, 12 and 13 face in the same direction as that of the display element 11. Accordingly, it is not necessary to increase the distance between the projection lenses 14 and 15 or 14 and 16 of the adjacent sets, depending on the size of the display elements 11, 12 and 13, when the size of the display elements 11, 12 and 13 becomes larger. According to the present invention, it is possible to reduce the distance between the adjacent projection lenses 14 and 15 or 14 and 16 as small as possible just before these projection lenses contact each other. By reducing the distance between the adjacent projection lenses 14 and 15 or 14 and 16, it is possible to reduce uneven color distribution and color shift on the screen.

Figure 2:
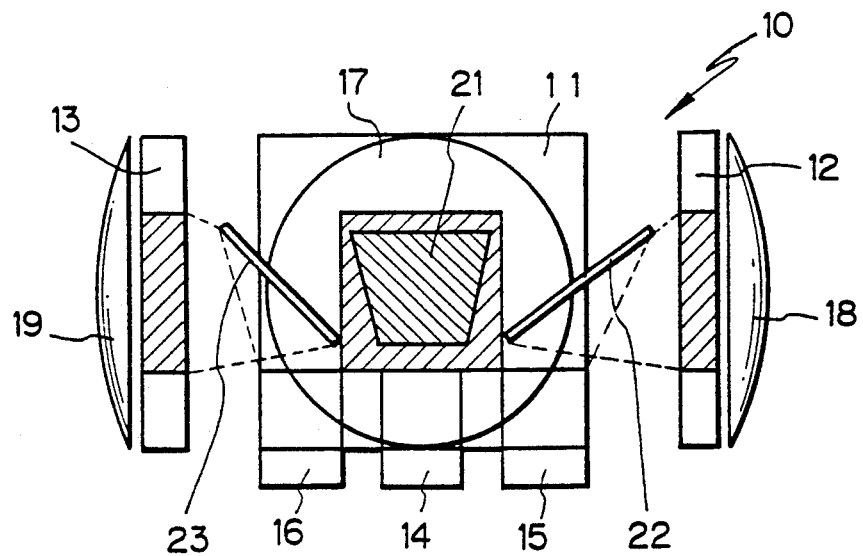
FIG. 2 is a diagrammatic view of a projection display device according to the second embodiment of the present invention.

FIG. 2 shows a projection display device 10 according to the second embodiment of the present invention. Also, in this case, the projection display device 10 comprises three display elements 11, 12 and 13, and three projection lenses 14, 15 and 16. The projection lenses 14, 15 and 16 are arranged in a row in a side by side relationship and have respective optical axes extending parallel to each other, similar to the first embodiment. A mirror 22 is arranged between the display element 12 and the projection lens 15 of the right set, and a mirror 23 is arranged between the display element 13 and the projection lens 16 of the left set.

In this embodiment, a mirror 21 is arranged between the display element 11 and the projection lens 14 of the central set. The right display element 12 and the left display element 13 are in respective planes perpendicular to the sheet of FIG. 2, but the central display element 11 is in a plane parallel to the sheet of FIG. 2 below or above the sheet so that the optical path from the central display element 11 that extends perpendicular to the sheet of FIG. 2 is bent by the mirror 21 in a direction parallel to the sheet of FIG. 2, and also in this case, the central display element 11 faces in a direction different from those of the right and left display elements 12 and 13, respectively. Also, the length of the optical path between the display element and the projection lens of each set equals that of the remaining sets.

Figure 3A:
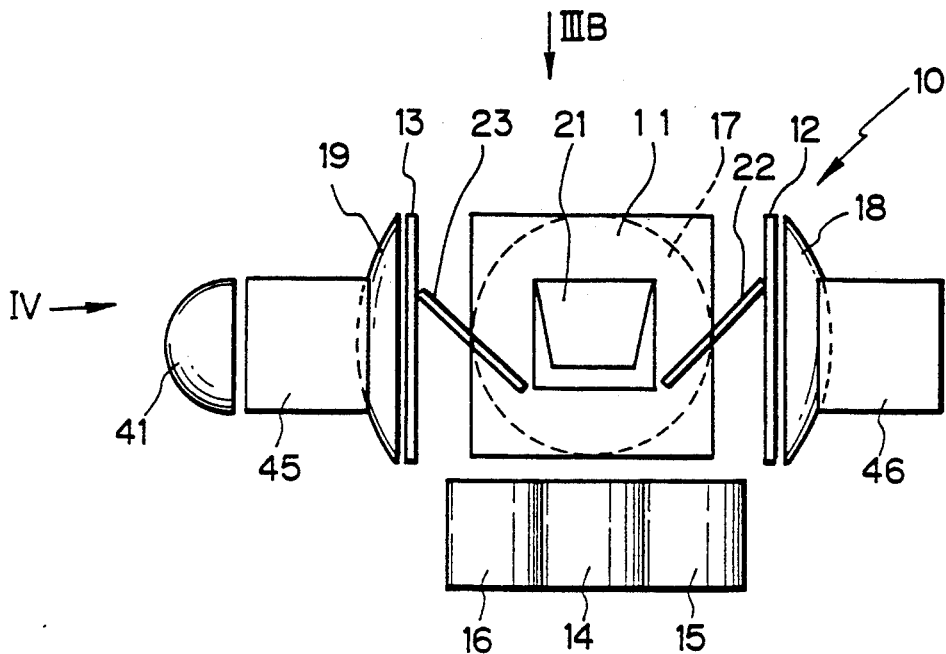
FIG. 3A is a diagrammatic plan view of the projection display device having a similar feature to that of FIG. 2 and viewed from the arrow IIIA in FIG. 3B.
Figure 3B:
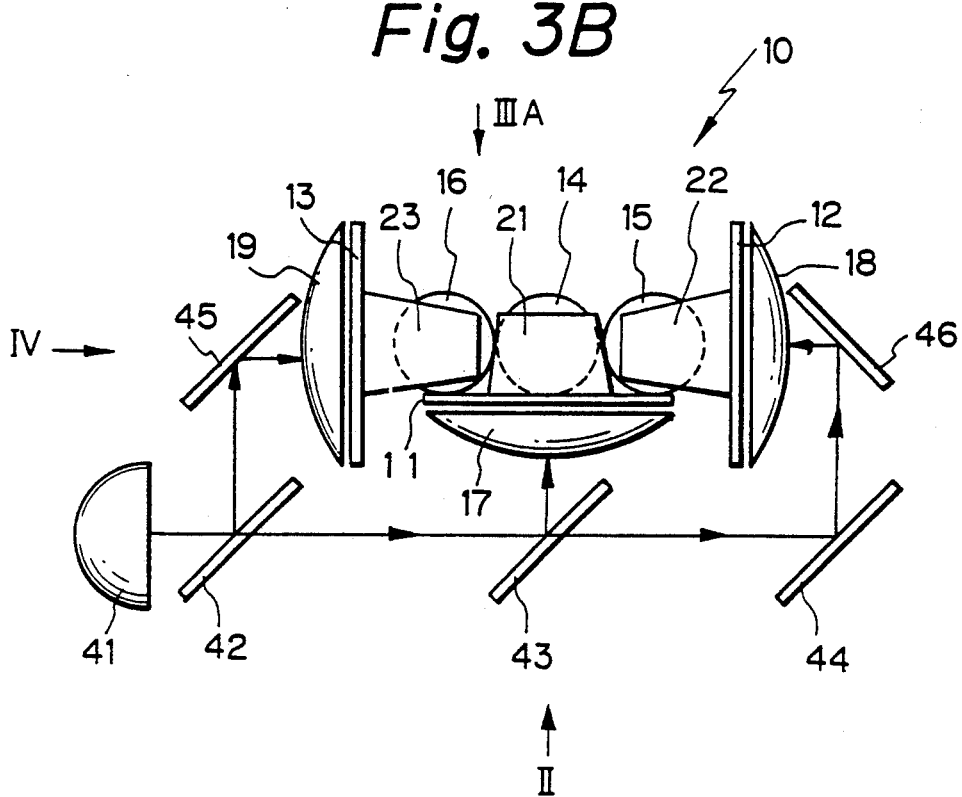
FIG. 3B is a rear view of the device of FIG. 3A viewed from the arrow IIIB in FIG. 3A.
Figure 4:
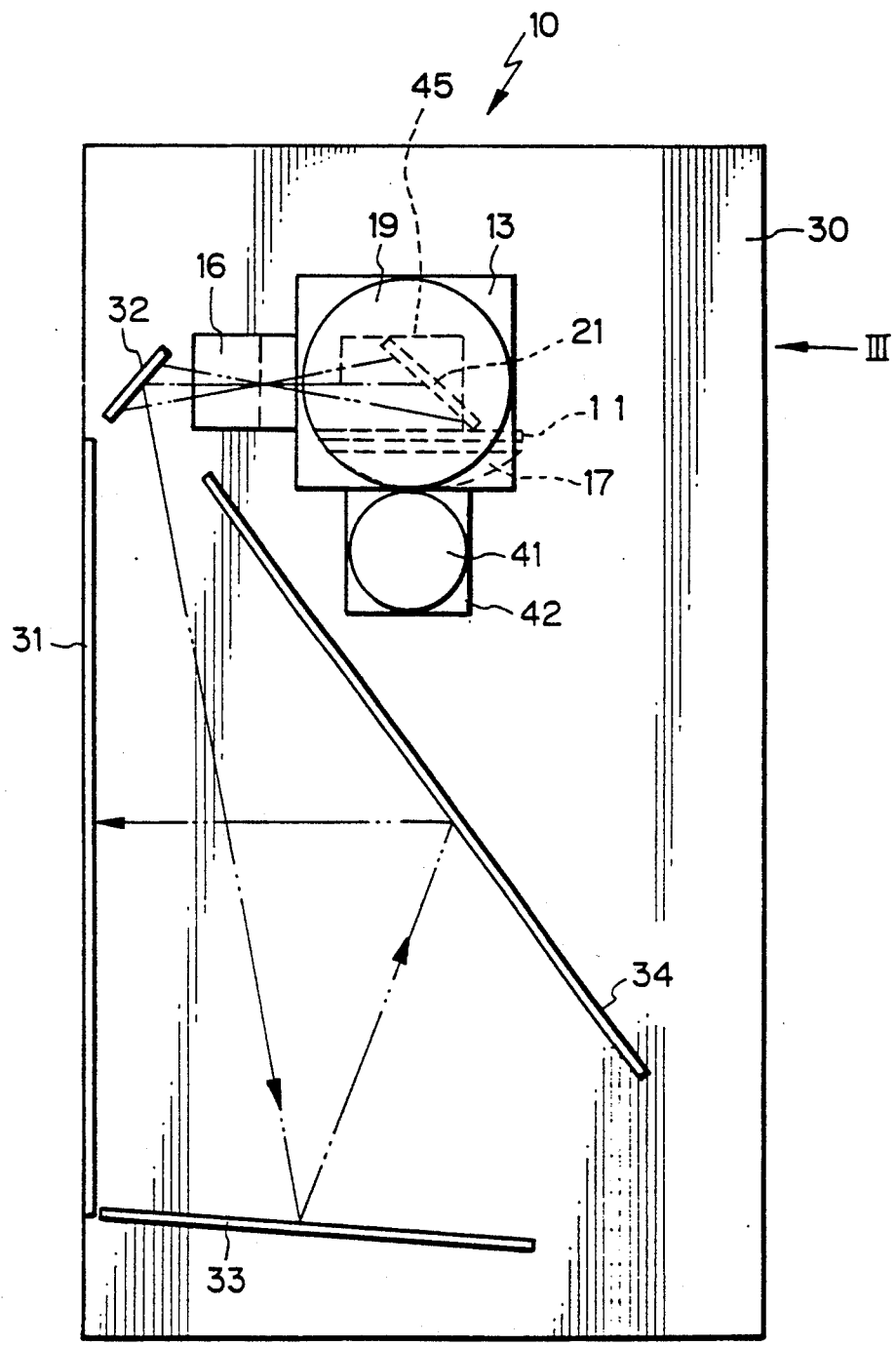
FIG. 4 is a diagrammatic side elevational view of the device of FIGS. 3A and 3B accommodated in the case and viewed from the arrow IV in FIGS. 3A and 3B.

FIG. 3A is a plan view showing the projection display device 10 having a similar feature to that of FIG. 2 and viewed from the arrow IIIA in FIG. 3B, and FIG. 3B is a rear view of the device of FIG. 3A viewed from the arrow IIIB in FIG. 3A. FIG. 4 is a diagrammatic side elevational view of the device of FIGS. 3A and 3B accommodated in a case and viewed from the arrow IV in FIGS. 3A and 3B.

In FIGS. 3A to 4, the liquid crystal display device 10 is accommodated in a case 30 having a screen 31 at the front surface thereof, so that the images formed by the display elements 11, 12 and 13 are projected by the projection lenses 14, 15 and 16 onto the rear surface of the screen 31 and superposed on the screen to mix the colors. To minimize the size of the case 30, optical bending mirrors 32, 33 and 34 are arranged between the projection lenses 14, 15 and 16 and the screen 31. The largest mirror 34 is arranged in the case 30 diagonally across the case 30, and the liquid crystal display device 10 is arranged in the remaining space above the mirror 34.

The liquid crystal display device 10 includes a source of high bright light 41 such as a metal halide lamp or xenon lamp. The light from the source 41 is separated into blue, green and red color lights by dichroic mirrors 42 to 44 (the blue reflecting dichroic mirror 42, the green reflecting dichroic mirror 43 and the red reflecting dichroic mirror 44). The blue light reflected by the blue reflecting dichroic mirror 42 is further reflected by a mirror 45 and is incident on the left display element 13 via the left condenser lens 19. The green light reflected by the green reflecting dichroic mirror 43 is incident on the central display element 11 via the central condenser lens 17. The red light reflected by the red reflecting dichroic mirror 44 is further reflected by a mirror 46 and incident on the right display element 12 via the right condenser lens 18. Each condenser lens 17, 18 or 19 converges each color light toward each projection lens 14, 15 or 16. Each color light incident on each display element 11, 12, or 13 is modulated to an image of light, bent by the respective mirror 21, 22, or 23, and incident on each projection lens 14, 15 or 16. In this embodiment, the source of light 41 and the dichroic mirrors 42 to 44 are arranged below the projection lenses 14, 15 and 16.

Figure 5:
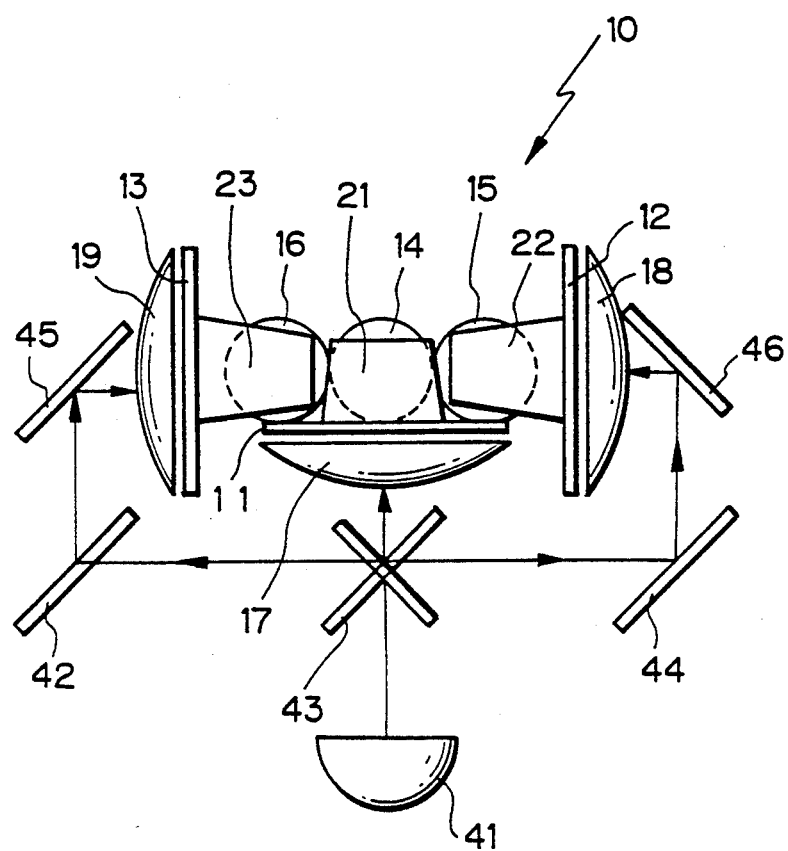
FIG. 5 is a view similar to FIG. 3A but showing a modification thereof.

FIG. 5 shows a modification of the liquid crystal display device 10 of FIG. 3B, in which the positions of the source of light 41 and the dichroic mirrors 42 to 44 vary from those of FIG. 3B. In FIG. 5, the source of light 41 is arranged coaxially with the central display element 11, and the central dichroic mirror 43 is formed in an X-shape. The operation of the device of FIG. 5 is similar to that of the previous embodiment.

Figure 6:
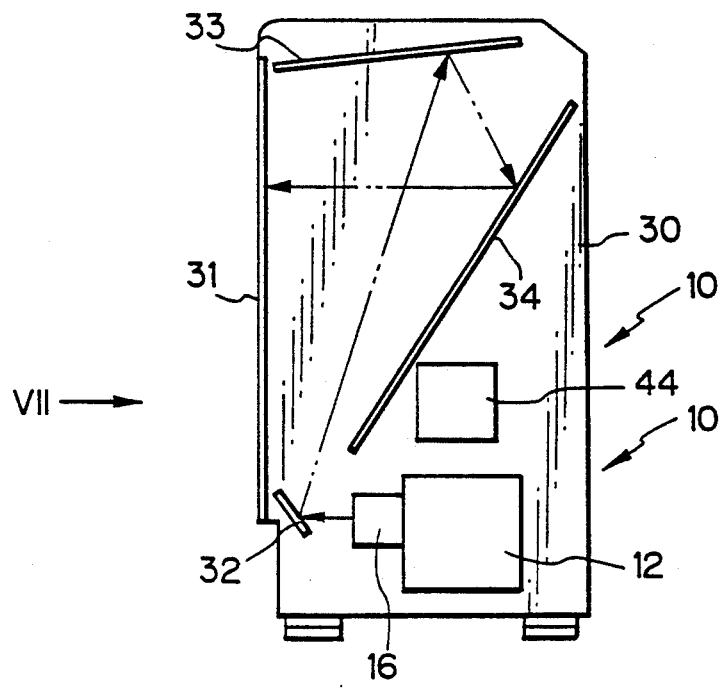
FIG. 6 is a view similar to FIG. 4 but showing a modification thereof.
Figure 7:
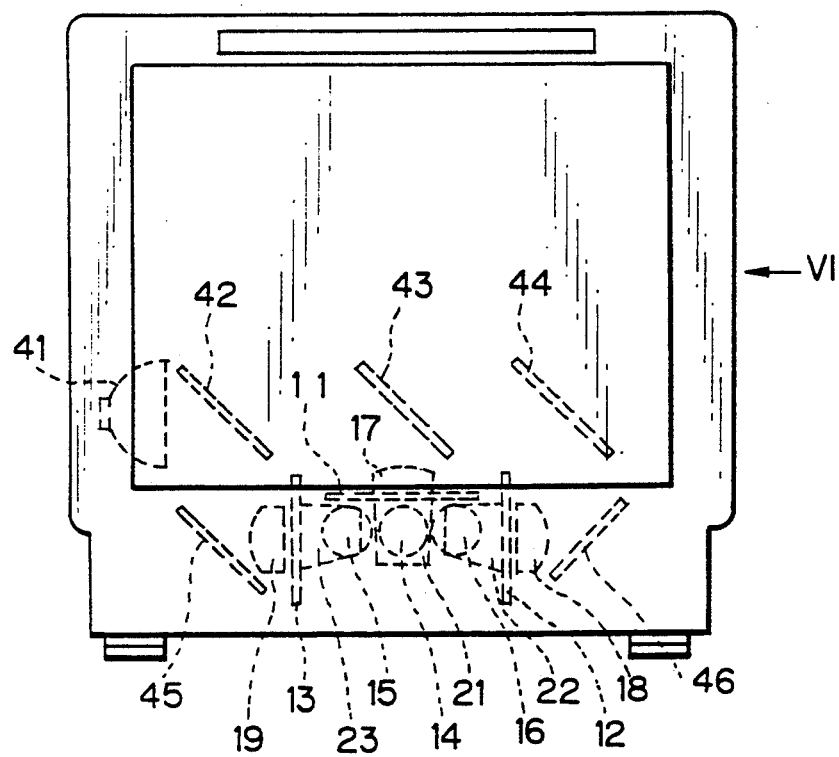
FIG. 7 is a front view of the device of FIG. 6.

FIGS. 6 and 7 show a modification of the liquid crystal display device 10 of FIGS. 3A to 4, in which the liquid crystal display device 10 is accommodated in a case 30 having a screen 31 at the front surface thereof, so that the images formed by the display elements 11, 12 and 13 are projected by the projection lenses 14, 15 and 16 onto the rear surface of the screen 31 and superposed on the screen to mix the colors. To minimize the size of the case 30, optional bending mirrors 32, 33 and 34 are arranged between the projection lenses 14, 15 and 16 and the screen 31. The largest mirror 34 is arranged in the case 30 diagonally across the case 30, and in this embodiment, the mirror 34 is arranged in a reverse inclination compared with that of FIG. 4. The liquid crystal display device 10 is arranged in the remaining space below the mirror 34, and the elements of the liquid crystal display device 10 are arranged vertically and in reverse order to those of FIGS. 3A to 4.

Figure 8:
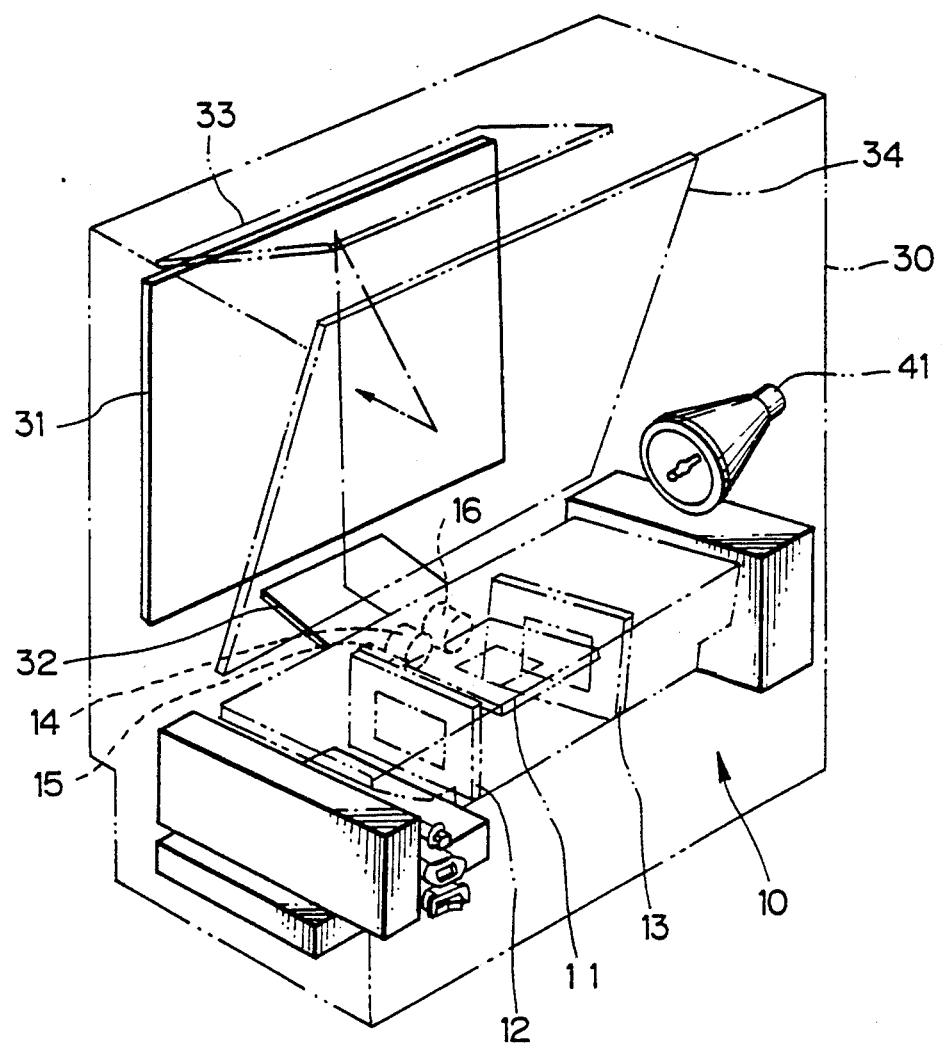
FIG. 8 is a rear perspective view of the device of FIGS. 6 and 7.

FIG. 8 is a rear perspective view of the projection display device 10 of FIGS. 6 and 7, showing three display elements 11, 12 and 13 and the source of light 41 arranged in the space below the mirror 34. The mirrors 21, 22 and 23 in the sets and the dichroic mirrors 41, 42 and 43 are omitted in FIG. 8. These components constituting the projection display device 10 are detachably mounted as a unit to the case 30.

Figure 9:
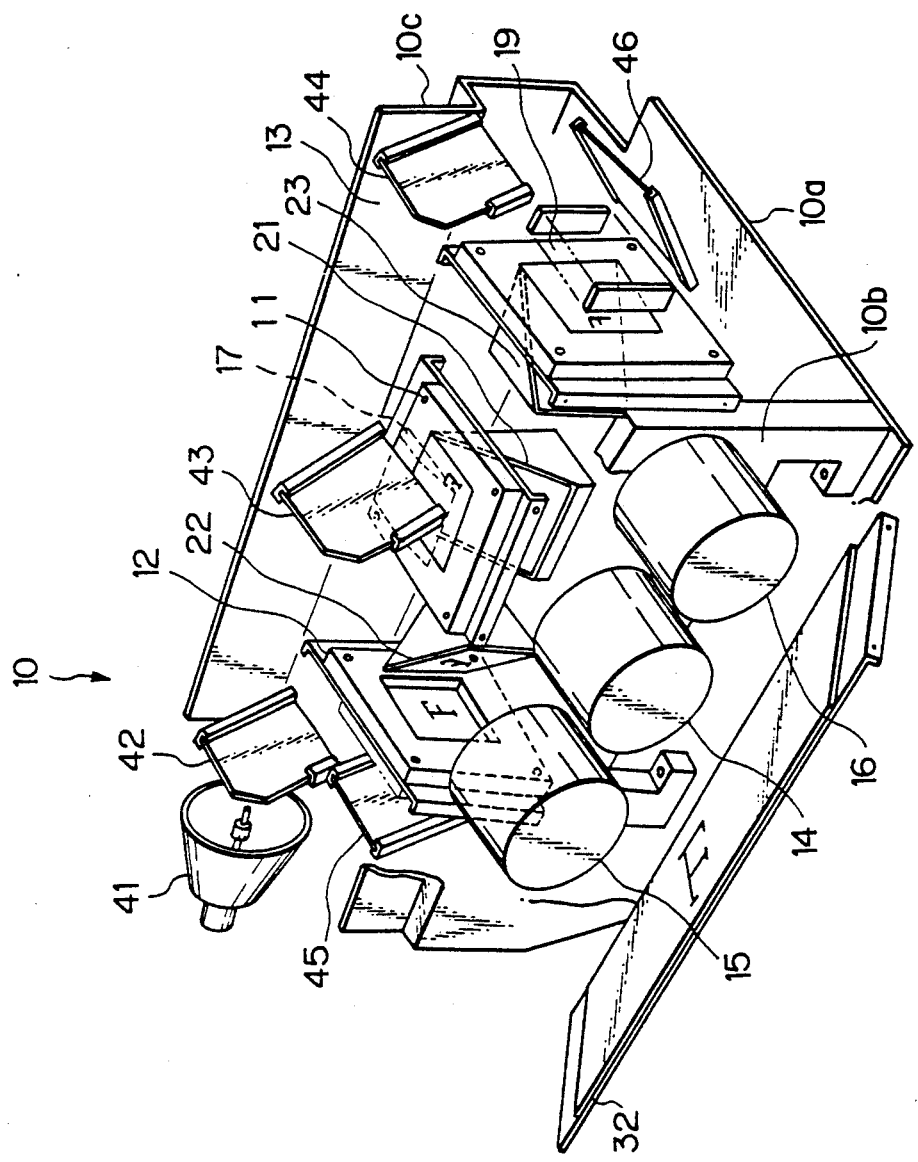
FIG. 9 is a perspective view of the device of FIG. 8 assembled as a unit.

FIG. 9 is a perspective view of the projection display device 10 of FIG. 8 assembled as a unit. The unit comprises a frame having a bottom wall portion 10a, a front wall portion 10b standing at the front edge of the bottom wall portion 10a, and a rear wall portion 10c standing at the rear edge of the bottom wall portion 10a. Components of the projection display device 10 are held by the respective holders which are appropriately secured to the bottom wall portion 10a, the front wall portion 10b and the rear wall portion 10c. It is of illustrated unit.

Figure 10:
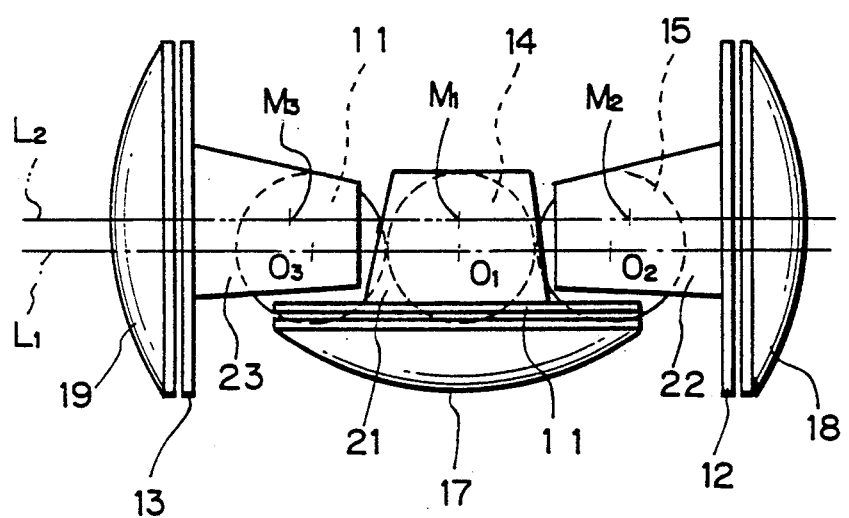
FIG. 10 is a rear view of the device similar to FIG. 3B and further showing a relationship of the axes of the display elements and the projection lenses.

FIG. 10 is a rear view of the projection display device 10 for illustrating the optical paths between the display elements 11, 12 and 13 and the projection lenses 14, 15 and 16, respectively. $O_1$, $O_2$ and $O_3$ show the optical axes of the projection lenses 14, 15 and 16, respectively, and the line $L_1$ is a line interconnecting the optical axes $O_1$, $O_2$ and $O_3$, and the line $L_2$ is a line interconnecting the display elements 12 and 13. $M_1$, $M_2$ and $M_3$ show the optical axes of the light paths passing through the optical axes of the display elements 11, 12 and 13 after the lights are bent by the mirrors 21, 22 and 23, respectively. That is, the light passing through the optical axis of the display device 11 is bent by the mirror 21 in a direction parallel to the optical axis of the projection lens 14 and the light having the optical axis $M_1$ is incident on the projection lens 14 in relation to the optical axis $O_1$. Similarly, the lights passing through the optical axes of the display device 12 and 13 are bent by the mirrors 22 and 23 in a direction parallel to the optical axes of the projection lenses 15 and 16 and the light having the optical axes $M_2$ and $M_3$ are incident on the projection lenses 15 and 16 in relation to the optical axes $O_2$ and $O_3$, $O_1$, respectively.

Figure 11A:
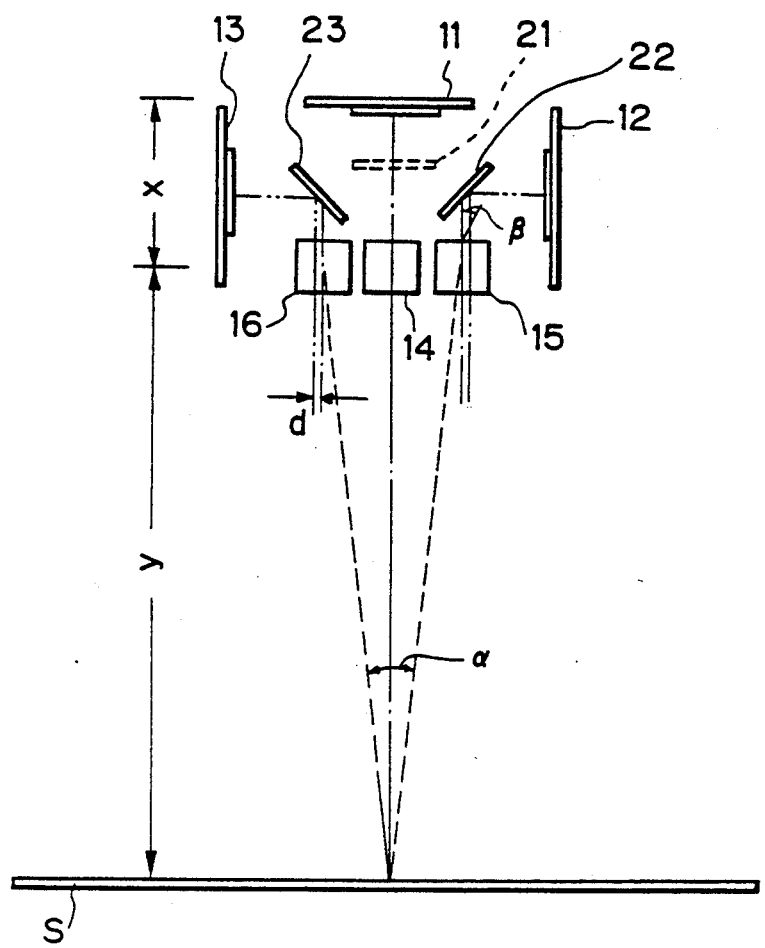
FIG. 11A is a plan view of the device of FIG. 10 further showing details of the offset of axis between display elements and the projection lenses, with the central display element being rotated 90 degrees for illustration purposes.
Figure 11B:
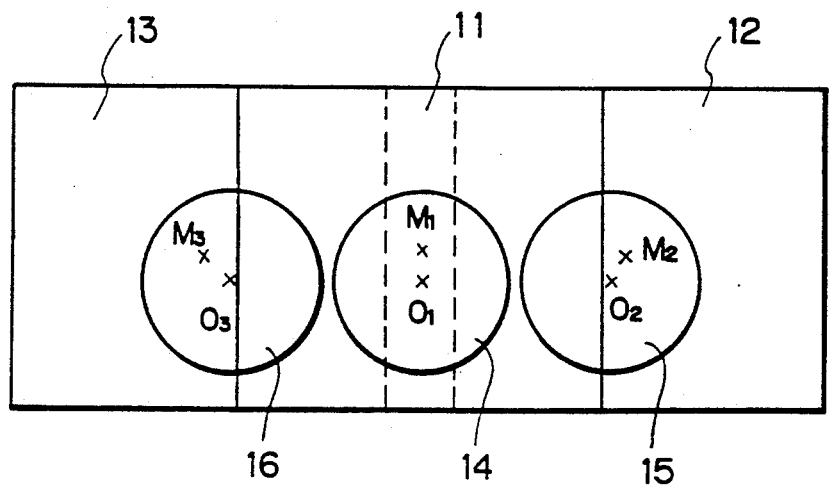
FIG. 11B is a front view of the device of FIG. 11A, with the display elements at positions assumed to be on a common plane.

FIG. 11A is a plan view of the projection display device 10 of FIG. 10 and further showing details of the offset of axis between the display elements 11, 12 and 13 and the projection lenses 14, 15, and 16. The central display element 11 is shown in a position rotated 90 degrees from that of FIG. 10, for illustration purposes. FIG. 11B is a front view of the projection display device 10 of FIG. 11A. The display elements 11, 12 and 13 are shown at positions assumed to be in a common plane.

In FIG. 11A, the width of the displaying zone of each of the display elements 11, 12 and 13 is approximately 65 millimeters, and the width of each of the full display elements 11, 12 and 13 is approximately 120 millimeters. Also, the diameter of each of the projection lenses 14, 15, and 16 with the holders thereof is approximately 30 millimeters. The focal distance and magnifying power of each of the projection lenses 14, 15, and 16 are 105 millimeters and 8 millimeters, respectively. The distance x between one of the display elements 11, 12 and 13 and one of the corresponding projection lenses 14, 15, and 16 is 118 millimeters, and the distance y between the projection lenses 14, 15, and 16 and the screen S is 945 millimeters.

The present invention strives to reduce the distance between the adjacent projection lenses 14 and 15, or 15 and 16. Accordingly, the projection lenses 14, 15, and 16 are arranged so as to have a pitch of 31 millimeters (namely, the distance is 1 millimeter). A distance of 1 millimeter is necessary for the adjustment of the positions of the projection lenses 14, 15, and 16. Even in this geometric arrangement, the display elements 11, 12 and 13 do not contact each other because the display elements 11, 12 and 13 are arranged so as to face in different directions from each other.

With this arrangement, it is possible to determine whether the amount of the offset of axis d is 4 millimeters, the convergent angle $\alpha$ is lower than 4 degrees, and the angle of view $\beta$ is 46 degrees.

If the display elements 11, 12 and 13 are arranged on a common plane under the above described geometric arrangement, the display elements 11, 12 and 13 must be superposed on one another, as assumed and shown in FIG. 11B. Accordingly, the above described geometric arrangement cannot be achieved without the mirrors 21, 22 and 23.

Figure 12:
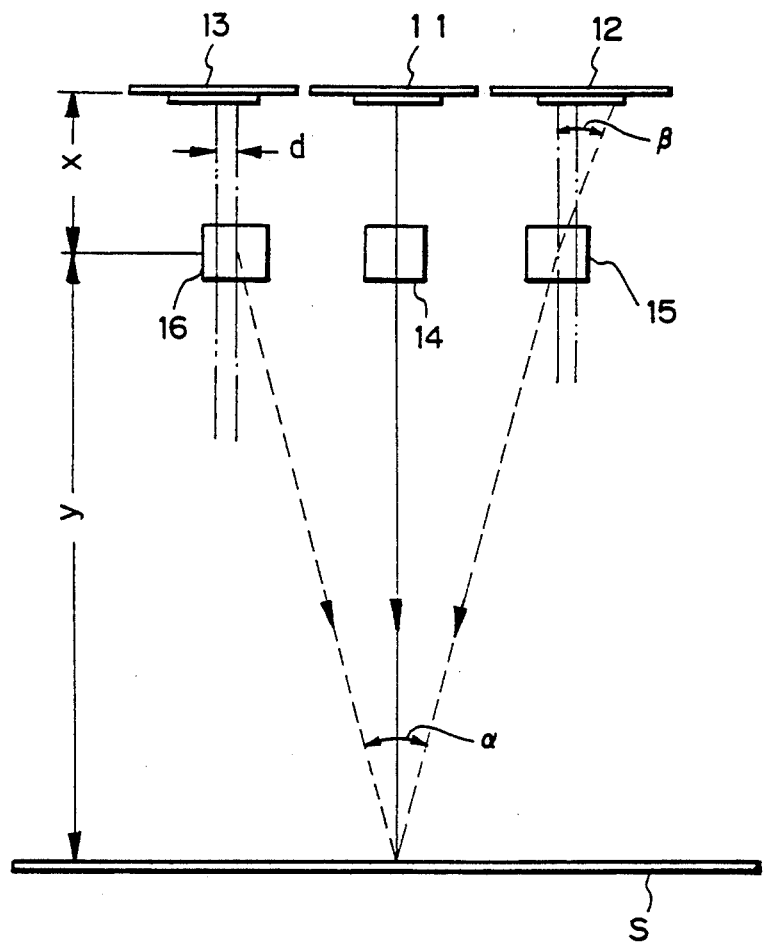
FIG. 12 is a view similar to FIG. 11A but showing the prior art arrangement.

FIG. 12 shows the prior art arrangement compared to the arrangement of FIG. 11A. Here, the display elements 11, 12 and 13 and the projection lenses 14, 15, and 16 have identical sizes to those of FIG. 11A. In the prior art, the display elements 11, 12 and 13 must first be arranged in a row in a side by side relationship because the display elements 11, 12 and 13 cannot be arranged in a manner assumed in FIG. 11B. The projection lenses 14, 15 and 16 are then arranged depending on the positions of the display elements 11, 12 and 13, respectively. The amount of the offset of axis d is obtained by the relationship, d=(pitch of the display elements)/(multiplying power+1). Therefore, it is necessary to increase the amount of the offset of axis d if the pitch of the display elements becomes larger. In the arrangement of FIG. 12, the pitch of the display elements is 120 millimeters at the maximum. Therefore, the amount of the offset of axis d is approximately 13 millimeters. The convergent angle $\alpha$ is approximately 13 degrees and it is necessary to use the projection lenses 14, 15, and 16 having an angle of view $\beta$ of 52 degrees. It will be understood that uneven color distribution and color shift on the screen S increases with an increase in the convergent angle $\alpha$.

Further, the offset of axis between each pair of display elements 11, 12 and 13 and projection lenses 14, 15, and 16 is effected horizontally as well as vertically, as shown in FIG. 11B. The amount of the offset of axis d described heretofore is the amount of the horizontal offset of axis. The amount of the vertical offset of axis is 11 millimeters, which is common to all pairs of display elements 11, 12 and 13 and the projection lenses 14, 15, and 16. The vertical offset of axis is effected depending on the dependency of the viewing angle of the liquid crystal. That is, it is well known that the liquid crystal display device has a viewing angle depending on whether a display having a good contrast is viewed and another viewing angle depending on whether a whitish display with a poor contrast is viewed. The vertical offset of axis is intended to effectively utilize the viewing angle having a good contrast.

Figure 13:
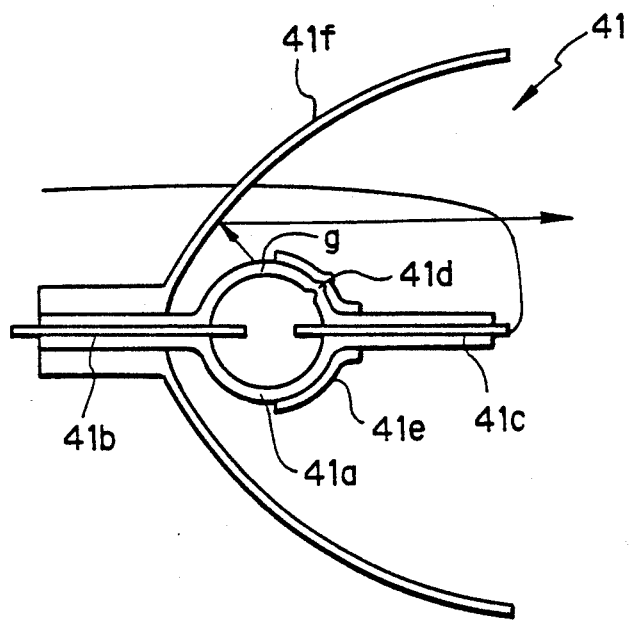
FIG. 13 is a view of an example of a preferable source of light.

FIG. 13 shows a preferable example of the source of light 41. It is preferable to use a high bright metal halide lamp or xenon lamp. The lamp comprises a transparent bulb 41 having a pair of electrodes 41b and 41c and a light emitting material sealed therein. The transparent bulb 41a has an inlet portion 41d from which the light emitting material is inserted into the transparent bulb 41a. The inlet portion 41d is closed after the light emitting material is inserted but a trace of the inlet portion 41d remains on the transparent bulb 41a. Conventionally, the inlet portion 41d was located on one side of the transparent bulb 41a (at a position of g, for example) for facilitating the work, and there may be the case that the light emitting from the inlet portion g of the lamp at the inlet portion, which is reflected by the concave mirror 41f, the dichroic mirrors 42 to 44 and other mirrors 45 and 46 and passes through three sets of the display elements 11, 12 and 13 and the projection lenses 14, 15, and 16, makes a dark spot on the screen. In the projection display device comprising three sets of the display elements 11, 12 and 13 and the projection lenses 14, 15, and 16, three such dark points are made because of a difference in the number of reflections and a difference in the direction of the offset of axis, resulting in an increase in uneven color distribution.

In FIG. 13, the inlet portion 41d or a trace thereof is located so that it is covered by a thermal protection layer 41e, which is provided at the tip of the transparent bulb 41a for controlling the temperature of a gas upon an emission of the light and for providing the light of a predetermined spectrum. The lamp is usually used with a concave mirror 41f and a portion of the light at the thermal protection layer 41e is not emitted from concave mirror 41f.

Figure 14:
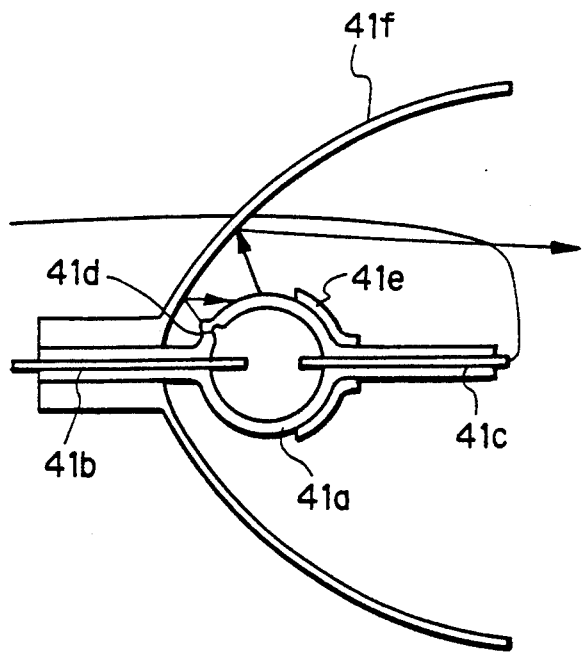
FIG. 14 is a view of another example of a preferable source of light.

In FIG. 14, the inlet portion 41d or a trace thereof is located at a position such that the light emitting from the inlet portion 41d is reflected by the concave mirror 41f but does not substantially reach the display elements 11, 12 and 13. Accordingly, dark spots are not made on the screen and the inlet portion 41d does not cause an increase in uneven color distribution.

FIGS. 15 to 21 show the third to ninth embodiments according to the present invention, respectively. Each of these embodiments includes three display elements 11, 12 and 13, and three projection lenses 14, 15 arranged in a row in a side by side relationship and having respective optical axes extending parallel to each other, but the directions of the display elements 11, 12 and 13 and the arrangement of the mirrors 21, 22 and 23 are changed with respect to the embodiments of FIGS. 1 and 2.

Figure 15:
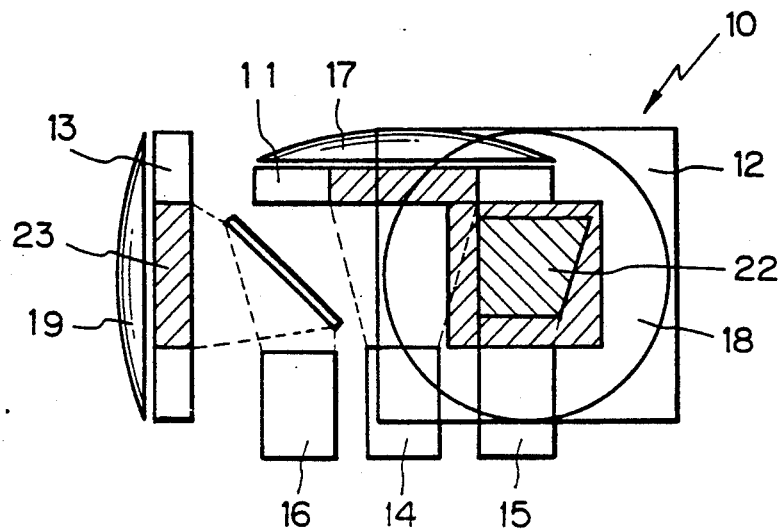
FIG. 15 is a diagrammatic view of a projection display device according to the third embodiment of the present invention.

In FIG. 15, the display element 11 of the central set generally aligns with the projection lens 14, the display element 12 of the right set is arranged perpendicular with respect to the optical axis of the projection lens 15 so as to face from above the plane of the sheet of FIG. 15 to below, and the display element 13 of the left set is arranged perpendicular with respect to the optical axis of the projection lens 16 to face from the left. In this case, the mirror 22 is arranged between the display element 12 and the projection lens 15 of the right set, and the mirror 23 is arranged between the display element 13 and the projection lens 16 of the left set.

Figure 16:
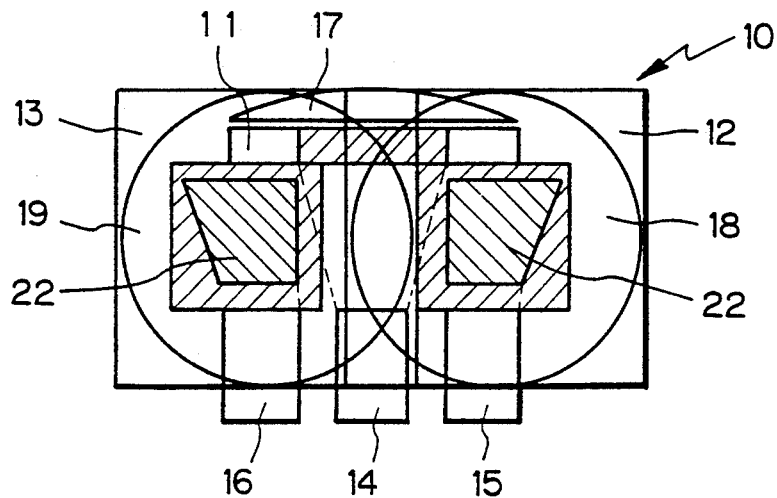
FIG. 16 is a diagrammatic view of a projection display device according to the fourth embodiment of the present invention.

In FIG. 16, the display element 11 of the central set generally aligns with the projection lens 14, the display element 12 of the right set is arranged perpendicular with respect to the optical axis of the projection lens 15 to face from above the plane of the sheet to below, and the display element 13 of the left set is arranged perpendicular with respect to the optical axis of the projection lens 16 facing from below the plane of the sheet to above. In this case, the mirror 22 is arranged between the display element 12 and the projection lens 15 of the right set, and the mirror 23 is arranged between the display element 13 and the projection lens 16 of the left set.

Figure 17:
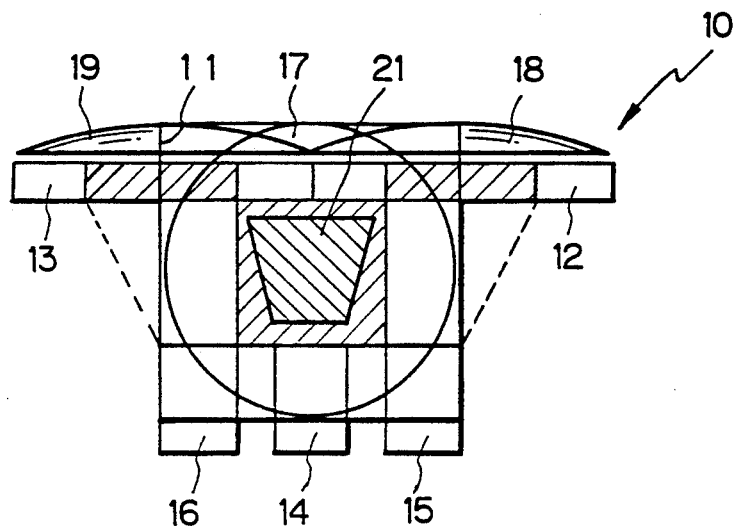
FIG. 17 is a diagrammatic view of a projection display device according to the fifth embodiment of the present invention.

In FIG. 17, the display element 11 of the central set is arranged perpendicular with respect to the optical axis of the projection lens 14 to face from above the plane of the sheet to below, the display element 12 of the right set generally aligns with the projection lens 15, and the display element 13 of the left set generally aligns with the projection lens 16. This arrangement is in reverse order to that of the arrangement of FIG. 1. In this case, the mirror 21 is arranged between the display element 11 and the projection lens 14 of the central set.

Figure 18:
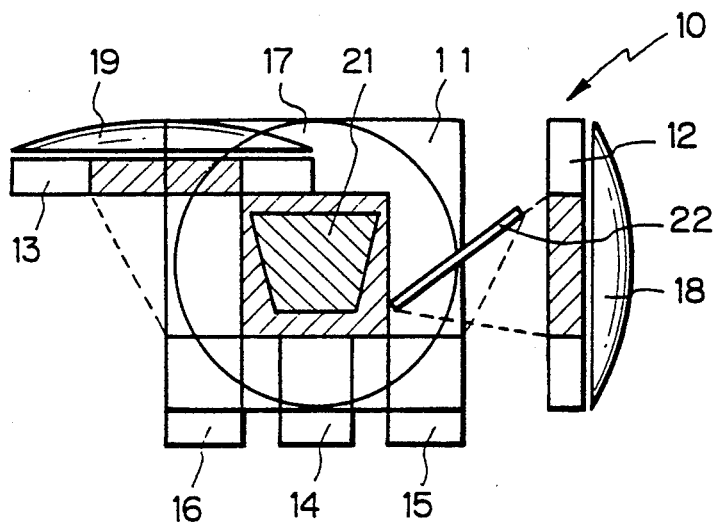
FIG. 18 is a diagrammatic view of a projection display device according to the sixth embodiment of the present invention.

In FIG. 18, the display element 11 of the central set is arranged perpendicular with respect to the optical axis of the projection lens 14 so as to face from above the plane of the sheet to below, the display element 12 of the right set is arranged perpendicular with respect to the optical axis of the projection lens 15 so as to face from the right, and the display element 13 of the left set generally aligns with the projection lens 16. In this case, the mirror 21 is arranged between the display element 11 and the projection lens 14 of the central set, and the mirror 22 is arranged between the display element 12 and the projection lens 15 of the right set. In this example, the directions of the adjacent mirrors 21 and 22 are different from each other.

Also, this embodiment can be interpreted such that the mirror 22 is arranged between the display element 12 and the projection lens 15 of one of the two outer sets and a mirror is not arranged between the display element 13 and the projection lens 16 of the remaining outer set.

Figure 19:
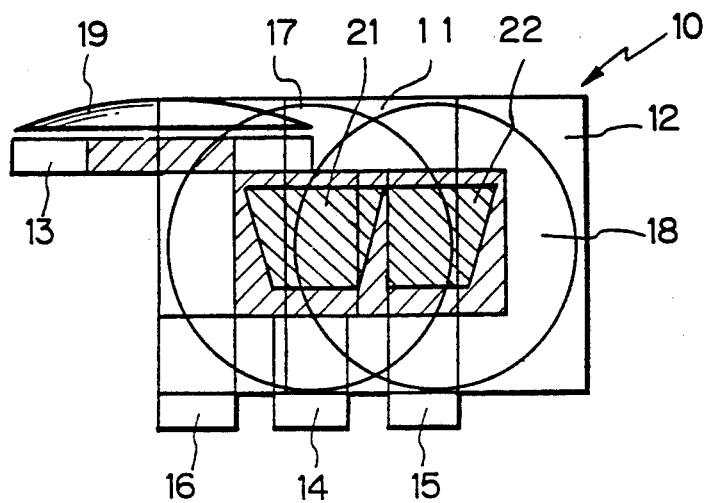
FIG. 19 is a diagrammatic view of a projection display device according to the seventh embodiment of the present invention.

In FIG. 19, the display element 11 of the central set is arranged perpendicular with respect to the optical axis of the projection lens 14 so as to face from above the plane of the sheet to below; the display element 12 of the right set is arranged perpendicular with respect to the optical axis of the projection lens 15 so as to face from below the plane of the sheet to above, and the display element 13 of the left set generally aligns with the projection lens 16. In this case, the mirror 21 is arranged between the display element 11 and the projection lens 14 of the central set, and the mirror 22 is arranged between the display element 12 and the projection lens 15 of the right set.

Figure 20:
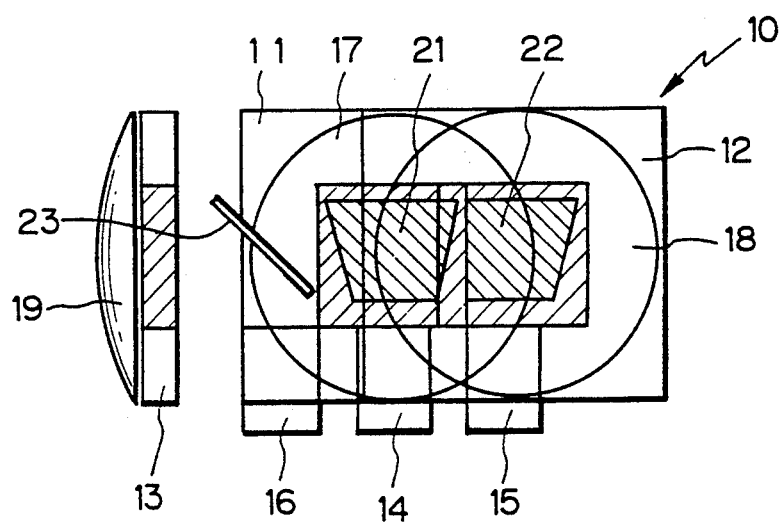
FIG. 20 is a diagrammatic view of a projection display device according to the eighth embodiment of the present invention.

In FIG. 20, the display element 11 of the central set is arranged perpendicular with respect to the optical axis of the projection lens 14 so as to face from above the plane of the sheet to below, the display element 12 of the right set is arranged perpendicular with respect to the optical axis of the projection lens 15 so as to face from below the plane of the sheet to above, and the display element 13 of the left set is arranged perpendicular with respect to the optical axis of the projection lens 16 so as to face from the left. In this case, the mirrors 21, 22 and 23 are arranged between the display elements 11, 12 and 13 and the projection lenses 14, 15 and 16 of all the sets, respectively.

Figure 21:
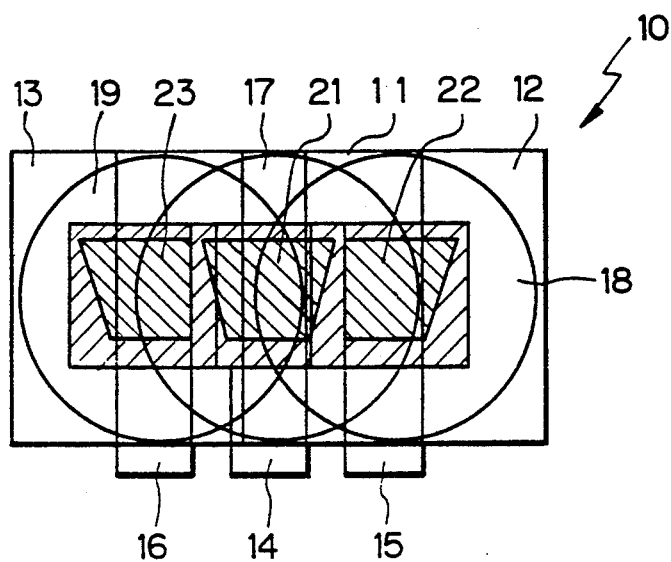
FIG. 21 is a diagrammatic view of a projection display device according to the ninth embodiment of the present invention.

In FIG. 21, the display element 11 of the central set is arranged perpendicular with respect to the optical axis of the projection lens 14 so as to face from above the plane of the sheet to below, the display element 12 of the right set is arranged perpendicular with respect to the optical axis of the projection lens 15 so as to face from below the plane of the sheet to above, and the display element 13 of the left set is arranged perpendicularly with respect to the optical axis of the projection lens 16 to face from below the plane of the sheet to above. In this case, the mirrors 21, 22 and 23 are arranged between the display elements 11, 12 and 13 and the projection lenses 14, 15 and 16 of all the sets, respectively.

FIGS. 22 to 25 show the embodiments in which the projection display device comprises three display device comprises three display elements 11, 12 and 13 and two projection lenses 14 and 15 (i.e., two sets of display elements and projection lenses and one additional display element). In these embodiments, one of the mirrors arranged between the display element and the projection lens also functions as a color mixing optical element arranged so as to receive images of the light from that display element and from the additional display element for mixing these images and delivering the same to that projection lens. The color mixing optical element may be constituted from at least one of a color mixing dichroic mirror, a half mirror and a polarized light separating and mixing element.

Figure 22:
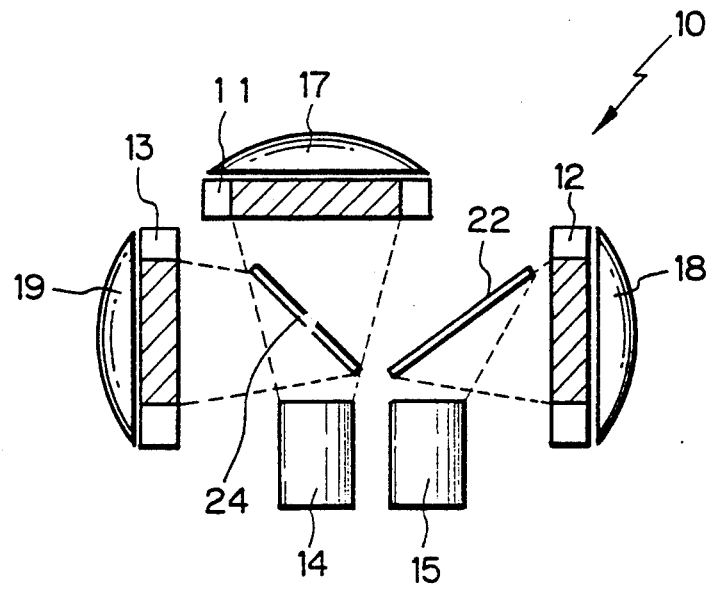
FIG. 22 is a diagrammatic view of a projection display device according to the tenth embodiment of the present invention.

In FIG. 22, for example, the central display element 11 is a red color display element, the right display element 12 is a blue color display element, and the left display element 13 is a green color display element. The central display element 11 substantially aligns with the left projection lens 14, and the left display element 13 is arranged perpendicular to the optical axis of the projection lens 14 so as to face from the left. The right display element 12 is arranged perpendicular to the optical axis of the projection lens 15 so as to face from the right.

The color mixing dichroic mirror 24 is arranged in the optical path between the central display element 11 and the left projection lens 14, and the left display element 13 is arranged to face the left projection lens 14. The color mixing dichroic mirror 24 is fabricated so as to transmit red color light and reflect blue color light. Accordingly, red color light from the central display element 11 passes through the color mixing dichroic mirror 24 to the left projection lens 14 and blue color light from the left display element 13 is reflected to the left projection lens 14. In this way, red color light and blue color light are mixed by the color mixing dichroic mirror 24.

It is possible, by this arrangement, to obtain a high quality display with less unused portions of light, brightness thereof is not reduced, and uneven color distribution and color shift are reduced. That is, there is a red color region, a green color region, and a blue color region in this order in the visible range of the spectrum, and by mixing red color and blue color light with green color light omitted, it is possible to determine a boundary wavelength of transmittance and reflection of the color mixing dichroic mirror 24 at approximately 550 nanometers, that is in the green color region. In general, the boundary wavelength of transmittance and reflection tends to shift to a longer wavelength side or a shorter wavelength side if the light is incident on the dichroic mirror with an angular distribution, but according to the present invention, the light separating property between red color light and blue color light is not affected by such a wavelength shift since the boundary wavelength of transmittance and reflection of the color mixing dichroic mirror 24 is at approximately 550 nanometers.

The ordinary mirror 23 is arranged between the right display element 12 and the right projection lens 15. The reflecting surface of the color mixing dichroic mirror 24 as a color mixing optical element is not parallel to the reflective surface of the mirror 22, which means that the right display element 12 and the left display element 13 are not arranged on the same side, and which is advantageous in that the distance between the mirrors 22 and 24 is less and the optical path lengths of all color lights are common.

Figure 23:
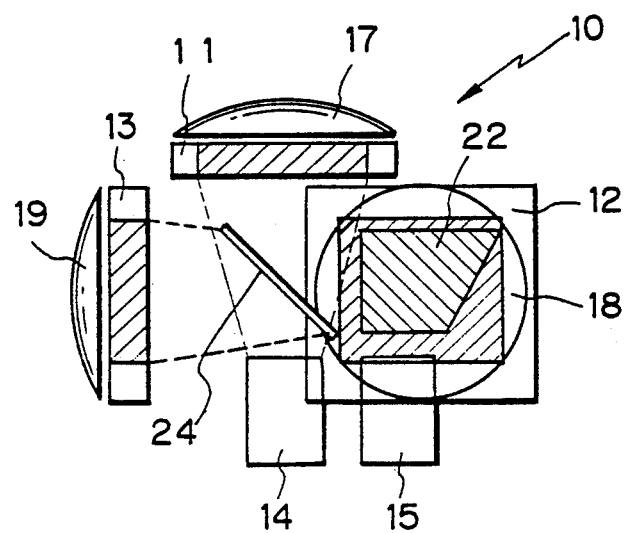
FIG. 23 is a diagrammatic view of a projection display device according to the eleventh embodiment of the present invention.

In FIG. 23, the central display element 11 generally aligns with the left projection lens 14, the right display element 12 is arranged perpendicular to the optical axis of the right projection lens 15 so as to face from above the plane of the sheet to below, and the left display element 13 is arranged perpendicular to the optical axis of the left projection lens 14 so as to face from the left. In this case, the color mixing dichroic mirror 24 is arranged for the central and left display elements 11 and 13, and the mirror 23 is arranged for the right display element 12.

Figure 24:
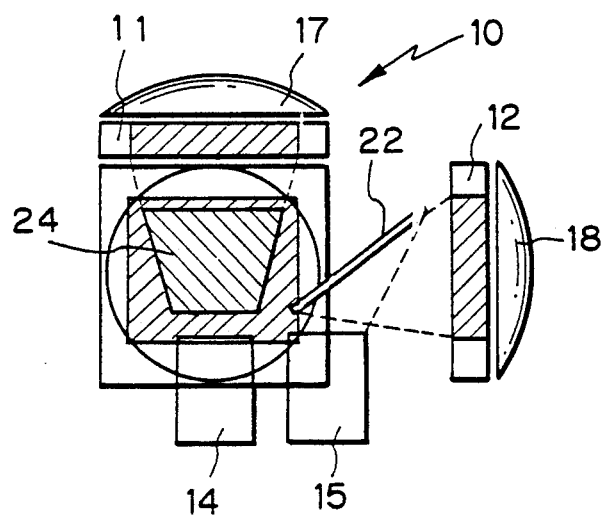
FIG. 24 is a diagrammatic view of a projection display device according to the twelfth embodiment of the present invention.

In FIG. 24, the central display element 11 generally aligns with the left projection lens 14, the right display element 12 is arranged perpendicular to the optical axis of the right projection lens 15 so as to face from the right, and the left display element 13 is arranged perpendicular to the optical axis of the left projection lens 14 so as to face from above the plane of the sheet to below. In this case, the color mixing dichroic mirror 24 is arranged for the central and left display elements 11 and 13, and the mirror 23 is arranged for the right display element 12.

Figure 25:
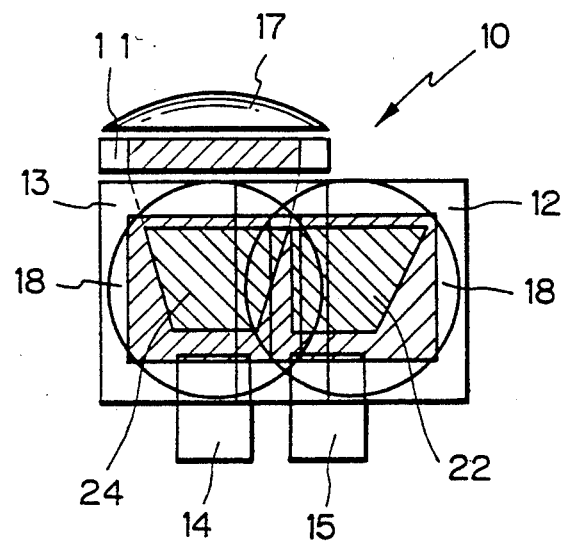
FIG. 25 is a diagrammatic view of a projection device according to a thirteenth embodiment of the present invention.

In FIG. 25, the central display element 11 generally aligns with the left projection lens 14, the right display element 12 is arranged perpendicular to the optical axis of the right projection lens 15 so as to face from below the plane of the sheet to above, and the left display element 13 is arranged perpendicular to the optical axis of the left projection lens 14 so as to face from above the plane of the sheet to below. In this case, the color mixing dichroic mirror 24 is arranged for the central and left display elements 11 and 13, and the mirror 23 is arranged for the right display element 12.

As explained in greater detail, it is possible to provide a projection display device in which the distance between the adjacent projection lenses is reduced and thus uneven color distribution and color shift is reduced.

We claim:

1. A projection display device comprising:
   a source of light;
   a plurality of display elements receiving light from the source and capable of forming images, respectively;
   a plurality of projection lenses arranged in a row in a side by side relationship and having respective optical axes extending parallel to each other, the display elements and the projection lenses being arranged to form sets individually; and
   a mirror arranged between the display element and the projection lens of at least one of the sets so that the display element in said at least one set faces in a first direction and the display element in the adjacent set faces in a second direction different from the first direction;
   wherein the display element in said at least one set and the display element in the adjacent set are arranged such that a distance between the projection lenses of the adjacent sets is smaller than would otherwise be possible when a mirror is not arranged between the display element in an arrangement in which the projection lens of any adjacent sets and display elements face in the same direction.

2. A projection display device according to claim 1, wherein the display element of said at least one set has an optical axis shifted from the optical axis of the projection lens of said at least one set.

3. A projection display device according to claim 1, wherein the display elements comprise three liquid crystal display panels and color separating dichroic mirrors are arranged between the source of light and the display elements.

4. A projection display device according to claim 3, wherein the source of light, the display elements, said mirror, and the projection lenses are mounted on a common frame.

5. A projection display device according to claim 1, wherein the source of light comprises a lamp comprising a transparent bulb having a light emitting material sealed therein and a thermal protection layer arranged on the bulb for controlling the temperature of the light, the transparent bulb having an inlet portion from which the light emitting material is initially inserted into the bulb, the inlet portion being covered by the thermal protection layer.

6. A projection display device according to claim 1, wherein the source of light comprises a lamp comprising a transparent bulb and a concave mirror for reflecting the light, the transparent bulb having a light emitting material sealed therein and an inlet portion from which the light emitting material is inserted into the bulb, the inlet portion being located at a position such that the light emitted from the inlet portion of the bulb is reflected by the concave mirror but does not substantially reach the display elements.

7. A projection display device according to claim 1, wherein three sets of the display elements and the projection lenses are arranged, and said mirror is arranged between the display element and the projection lens of each of all sets.

8. A projection display device according to claim 1, wherein the display element of a central one of the sets is arranged at an angle relative to the projection lens of the central one of the sets and the display elements of outer ones of the sets face in a different direction relative to the display element of the central set.

9. A projection display device according to claim 8, wherein the display elements of the outer sets face the opposite directions.

10. A projection display device according to claim 8, wherein the display elements of the outer sets face in the same direction.

11. A projection display device according to claim 1, wherein three sets of display elements and projection lenses are arranged, and said mirror is arranged between the display element and the projection lens of each of outer ones of the sets, and a mirror is not arranged between the display element and the projection lens of a central one of the sets.

12. A projection display device according to claim 11, wherein two sets of display elements and projection lenses and said additional display element are arranged, said three display elements being a red color display element, a blue color display element and a green color display element, and said color mixing optical element mixing the images from the blue color display element and the red color display element.

13. A projection display device according to claim 1, wherein three sets of display elements and projection lenses are arranged, and said mirror is arranged between the display element and the projection lens of each of a central one of the sets and an outer one of the sets, and a mirror is not arranged between the display element and the projection lens of another outer one of the sets.

14. A projection display device according to claim 1 comprising a rear projection display device wherein the projection lenses project images, respectively, on the rear surface of a screen in a superposed relationship, with the front surface of the screen being viewed.

15. A projection display device according to claim 1, wherein an additional display element is arranged in addition to the sets of display elements and projection lenses, the additional display element and one of the display elements of the sets being combined with one of the projection lens of the sets, a color mixing optical element being arranged between the additional display element and said display element.

16. A projection display device according to claim 15, wherein the color mixing optical element comprises a dichroic mirror.

17. A projection display device according to claim 16, wherein the dichroic mirror also comprises a mirror arranged between the display element and the projection lens of said at least one set, for bending the 18. A projection display device according to claim 1, wherein each of the display elements comprises a central displaying zone and a peripheral zone located on the outside of the central displaying zone, with the peripheral zone having an outer width; there being an offset of axis between axes of the projection lens and the display element of the set, a pitch between the projection lenses of the adjacent sets being smaller than the outer width of the peripheral region minus the offset of axis.

* * * * *